United States Patent
Neil et al.

(10) Patent No.: US 7,127,106 B1
(45) Date of Patent: Oct. 24, 2006

(54) FINGERPRINTING AND RECOGNITION OF DATA

(75) Inventors: Johnson Neil, Vienna, VA (US); Zoran Duric, Fairfax, VA (US); Sushil Jajodia, Oakton, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 807 days.

(21) Appl. No.: 10/281,191

(22) Filed: Oct. 28, 2002

Related U.S. Application Data (60) Provisional application No. 60/330,714, filed on Oct. 29, 2001.

(51) Int. Cl.
*G06K 9/00* (2006.01)

(52) U.S. Cl. ............... 382/181; 382/124; 382/209; 382/218; 382/305

(58) Field of Classification Search .............. 382/124, 382/165, 169, 170, 181, 190, 195, 209, 218, 382/224, 276, 299, 305
See application file for complete search history.

(56) References Cited

U.S. PATENT DOCUMENTS

| | | | | |
|---|---|---|---|---|
| 5,926,555 A | * | 7/1999 | Ort et al. | 382/124 |
| 6,002,785 A | * | 12/1999 | Ucida | 382/124 |
| 6,466,686 B1 | * | 10/2002 | Senior | 382/124 |
| 6,567,765 B1 | * | 5/2003 | Wu et al. | 702/182 |
| 6,895,104 B1 | * | 5/2005 | Wendt et al. | 382/125 |

OTHER PUBLICATIONS

Ratha, et al. "A Real-Time Matching System for Large Fingerprint Databases", IEEE, pp. 789-813, Aug. 1996.*

* cited by examiner

*Primary Examiner*—Daniel Miriam
(74) *Attorney, Agent, or Firm*—David G. Grossman (57) ABSTRACT

Disclosed is a method and apparatus for fingerprinting a first and second image and using the fingerprints of the first and second image to determine if the second image is derived from the first image.

24 Claims, 6 Drawing Sheets

FINGERPRINTING AND RECOGNITION OF DATA

CROSS-REFERENCE TO RELATED APPLICATIONS

This present application claims the benefit of provisional patent application Ser. No. 60/330,714 to Johnson et al., filed on Oct. 29, 2001, entitled "Fingerprinting and Recognition of Data," which is hereby incorporated by reference.

BACKGROUND OF THE INVENTION

The present invention generally relates to the field of fingerprinting and recognition of data.

There are many problems that may benefit from efficient fingerprinting and recognition of data including searching for an image or images over the Internet. The scope of tracking and filtering through images available on the Internet or in large repositories may be daunting. Some authors of digital images may wish to track their works or identify if any of their images have been copied illegally. These images may be distorted versions of the originals. There is a need to identify copied versions of images that may be descendants of the original copyrighted images without having to embed any copy protection data into said images.

There are two main techniques utilized for solving the problem of identifying illegal copies of copyrighted information in the prior art. The first involves utilizing an image database(s), and the second is involves utilizing digital watermarking techniques.

Image database techniques identifying and finding images can be simplified into two phases as described by G. Pass and R. Zabih in an article entitled, *Comparing Images Using Joint Histograms*, J. of Multimedia Systems, 1998. The first is the image summary where every image in the database is "summarized" with identifying features computed prior to retrieval. These features are used in the query process (summary comparison) when the user presents a query; a comparison measure is used to retrieve some number of the most similar images based on their feature match.

A variety of papers attempt to classify these two phases in image databases. Some of the same concepts are classified under differing terminology. Some authors identify these classifications based on "image identification" properties, and others define them as being "image query" properties. Two examples such papers include an article entitled "Metadata for Building the Multimedia Patch Quilt" by V. Kashyap, K. Shah, and A. Sheth, *in Multimedia Database Systems: Issues and Research Directions* 297 (Springer-Verlag 1996) and an article entitled "A Unified Approach to data Modeling and Retrieval for a Class of Image Database Application" by V. N. Gudivada, V. V Raghavan, and K. Vanapipat, *in Multimedia Database Systems: Issues and Research Directions* 36 (1996). In "Metadata for Building the Multimedia Patch Quilt," information about images is broken into three categories: content dependent, content-descriptive, and content-independent. Content dependent features are those that depend on the content of the image, such as color. Content-descriptive features are those that may describe the scene, such as mountain, car, or face. Content-independent features are those that do not rely on the image scene but properties of the image, such as scale and image file format.

Images may be indexed or categorized based on visual features, text annotation, assigned subjects, or image types. A lot of overlap exists in the classification of images and image queries. In the article "A Unified Approach to data Modeling and Retrieval for a Class of Image Database Application," queries are classified into five areas: retrieval by browsing, retrieval by objective attributes, retrieval by spatial constraints, retrieval by shape similarity, and retrieval by semantic attributes. Retrieval by browsing (RBR) is an example of a thumbnail search by a user, looking for a match. Retrieval by objective attributes (ROA) attempts to retrieve images based on matching the attribute values. Retrieval by spatial constraints (RSC) considers the spatial relationship of objects within an image, such as overlap, adjacency, multiples, or groups of objects. Retrieval by shape similarity (RSS) matches images based on similar shapes. Retrieval by semantic attributes (RSA) is based on the user's perception and understanding about the image.

Digital watermarks techniques may have several desirable advantages over image database techniques of identifying images. Many digital watermarks are invariant to scale, changes in color, and image format. A digital watermark is preferably integrated with the image content so it cannot be removed easily without severely degrading the image. Watermarks may provide information embedded within the image content that may relate to the owner, license, or tracking of an image. This embedded information may be a code that may later be used to identify the image. Instead of searching for image properties, contents, or similarity measures, one can simply search for the code. The result of finding a matching code is the exact image containing that code. If multiple images contain the same code (author information), then the set of images containing that code may be returned. In image database terms, a query for an image containing an embedded watermark should yield an exact image match as opposed to "similar" images. Using an embedded code may free system resources from storing and processing image metadata (color, scale, content, objects, etc.).

A central task to multimedia information systems is the management of images (storage and retrieval). Research in the area of image databases has focused on retrieval based on objects within images and based in matching algorithms for image similarities or in annotation. Such methods provide a means to reduce the searchable universe in locating the right image.

Image database techniques in the prior art have many significant limitations. A variety of tools use combinations of these classifications in building queries and searching for images. Techniques such as content-based retrieval, or query by example are typically based on color, image content (objects), spatial relationships, and annotation of image objects. Some so called content-based queries still rely on associated text to initiate the query process.

As image database systems evolve, the queries must be developed to cope with human perception where the similarity of two items is measured by the end-user. The basic approaches to image querying has been referred to as query by content, query by example, and similarity retrieval. The common end result in with any of these approaches is the retrieval images that although similar to the target image, are not the exact image. The pseudo-manual classification employed by many image database query techniques is time-consuming and potentially error-prone. Collecting text from web pages and file names may incorrectly identify and index images.

Color histograms are often used to compare images. However, color histograms lack spatial information, so images with very different appearances can have similar histograms. Colors may also change without changing the content, scene, or objects in the image (e.g. convert to gray-scale).

Various image database approaches assume that all images are scaled to contain the same number of pixels (are of the same dimensions), or only a small variation is present in the size, position, and orientation of the objects in images. Several factors may make such restrictions difficult in image databases. The query image is typically very different from the target image, so the retrieval method must allow for some distortions. If the query is scanned, it may suffer artifacts such as color shift, poor resolution, and dithering effects. In order to match such imperfect queries more effectively, the image database system must accommodate these distortions and yet distinguishes the target image from the rest of the database.

Since the input is only approximate, the approach taken by many image database systems is to present the user with a small set of the most promising target images as output, rather than with a single "correct" match.

Current digital watermarking techniques also have limitations. Watermarks provide means to identify images independent of image format, size, and color. Most of these techniques are sensitive to cropping and/or to affine distortions. However, watermarks may survive manipulations that cause image database techniques to fail to recognize the appropriate images. Digital watermarks further reduce the scope and provide a means of tracking for images. Watermarks may be used to locate a specific image or copies; however, watermarks are dependent on survivability of the embedded information and are vulnerable to attacks.

Image identification and recognition relies on the survivability of embedded features. These embed features may be vulnerable to distortions that make the watermarks unreadable. Disabling a watermark or embedded message is fairly easy and software is available that automates the image processing techniques required to make enough subtle changes to the image as to disable the watermark. When a watermark fails, the reading mechanism may not detect the existence of a watermark and the task of finding the illicit copies becomes daunting, especially so when the owner may have tens of thousands of digital images (this becomes a problem similar to image database queries).

What is needed is an image identification system that may find copies of images that have gone through modifications including drastic color shifts, cropping, resealing, resampling, or cropping. Preferably, this method will be capable of fingerprinting images wherein the number of points needed for recognition is small, and the recognition process is fast and reliable.

BRIEF SUMMARY OF THE INVENTION

One advantage of the invention is that the number of points needed for recognition is small, and the recognition process is fast and reliable.

Another advantage of this invention is that it may generate fingerprints that are capable of surviving image distortions, such as cropping, affine transformations, color shifts, blurring, resealing, and resampling.

A further advantage of this invention is that it may survive manipulation by tools designed to disable watermarking techniques.

Yet a further advantage of this invention is that the generated fingerprints may be used as part of an image database.

Yet a further advantage of this invention is that the database may be used to index, match, or track images.

Yet a further advantage of this invention is that the database may also be used to look for copies of compressed, printed or scanned images.

To achieve the foregoing and other advantages, in accordance with all of the invention as embodied and broadly described herein, a method for fingerprinting an image comprising the steps of: transforming the image to a gradient image; while the resolution of the gradient image is greater than a predetermined final resolution, iteratively: detecting features in the gradient image; creating a set of selected features from the detected features using a predetermined selection algorithm; associating the set of selected features with the current resolution gradient image; saving the set of selected features and the associated current resolution as a resolution specific image feature set; and decreasing the resolution of the gradient image; comparing the sets of saved selected features in at least one of the resolution specific image feature sets; assigning weights to the selected features in the resolution specific image feature sets using a predetermined weight setting algorithm; and sorting the selected feature points in the resolution specific image feature sets; wherein the resolution specific image feature sets now comprise a fingerprint for the fingerprinted image.

In yet a further aspect of the invention, a method for determining if a second image is a derivative copy of a first image comprising the steps of: generating a first image fingerprint using a fingerprinting algorithm which generates at least one resolution specific image feature set, each of the resolution specific image feature sets corresponding to a specific resolution variant of the image being fingerprinted using the fingerprinting algorithm; generating a second image fingerprint using the fingerprinting algorithm; creating at least one image feature set pair from the first image fingerprint and the second image fingerprint, where each image feature set pair consists of at least one resolution specific image feature set from the first image fingerprint and at least one resolution specific feature set from the second image fingerprint; and starting with an initial low resolution image feature set pair, iteratively: determining a confidence value for the image feature set pair; outputting the last matched pair if the confidence value is greater than a predetermined confidence threshold and there are no more image feature set pairs to process; outputting the last matched pair if the confidence value is less than a predetermined confidence and the highest resolution of any image features are greater than a predetermined resolution threshold; and reporting a mismatch if the confidence value is less than a predetermined confidence and the highest resolution of any image feature is not greater than a predetermined resolution threshold.

In yet a further aspect of the invention, an image fingerprinter for generating a fingerprint from an image comprising: a gradient identifier for converting the image to a gradient image; an image scaler for resealing the gradient image into a pyramid of various resolution gradient images, the pyramid having a multitude of pyramid levels; a feature detector for detecting features in each the pyramid of various resolution gradient images; a feature selector for selecting at least one selected feature point from each of the gradient images; a feature comparator for comparing the selected features from the gradient images at the same pyramid level for matches; a feature weight assigner for assigning a weight to each of the features determined by the quantity of matches each of the selected features has; and a feature sorter for sorting the selected features by their assigned weights; wherein, the fingerprint includes the sorted features and the assigned weights.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention provides a method for recognition and tracking of images over a network, on a computer, or in databases. This method may be implemented by associating a number of features (fingerprint) with each image. The recognition may be fast, reliable, and survive image distortions, such as cropping, affine transformations, color shifts, and blurring. Further, the present invention may index an image database, match or track images, or look for copies of compressed or printed and scanned images.

The present invention uses type features in the fingerprint that typically survive transforms and distortions that many other image database and watermark techniques cannot. Type features tend to be robust against color, scale, cropping, and image format. Since this method does not embed information into images, it is likely to survive manipulation by tools designed to disable watermarking techniques. Image recognition of this type may identify images derived from another image, given a set of features. The present invention may identify similar and exact matches. However, the threshold of correlation to recognize and identify "similar" images may be adjusted. In this setting, a "similar image" may not have similar content but similar structure. So a set of images with few matching features may be selected. By using a higher resolution of feature points, the selection process may be refined until an exact match is selected.

Figure 1:
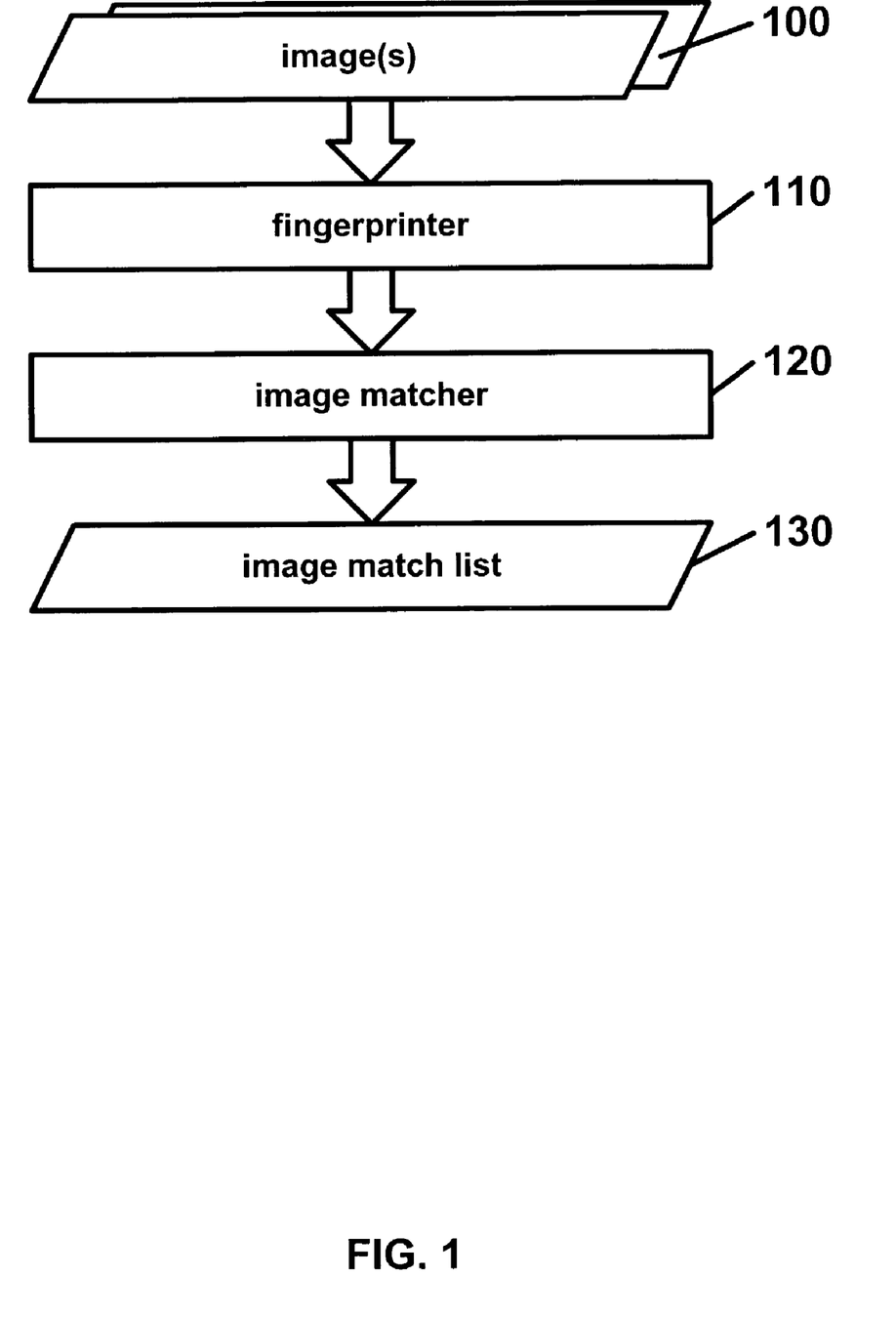
FIG. 1 is a block diagram of an image matcher as per an embodiment of the present invention.

FIG. 1 is a block diagram of an image matcher as per an embodiment of the present invention. This embodiment shows images 100 being processed in two phases. The first phase includes fingerprinting the images 100 using a fingerprinter 110, where a set of representative features at multiple resolutions may be selected. A second phase includes matching images using an image matcher 120, where selected features (fingerprint) in a first image may be matched with selected features in other images. The other images may come from a collection of candidate images or individually selected. The other images may also be collected from sources suspected of having copies including magazines, television, movies, the internet, or books. The matched features may then be used to compute affine invariants to enforce global matches. The matched images may be stored in an image match list 130.

Figure 2:
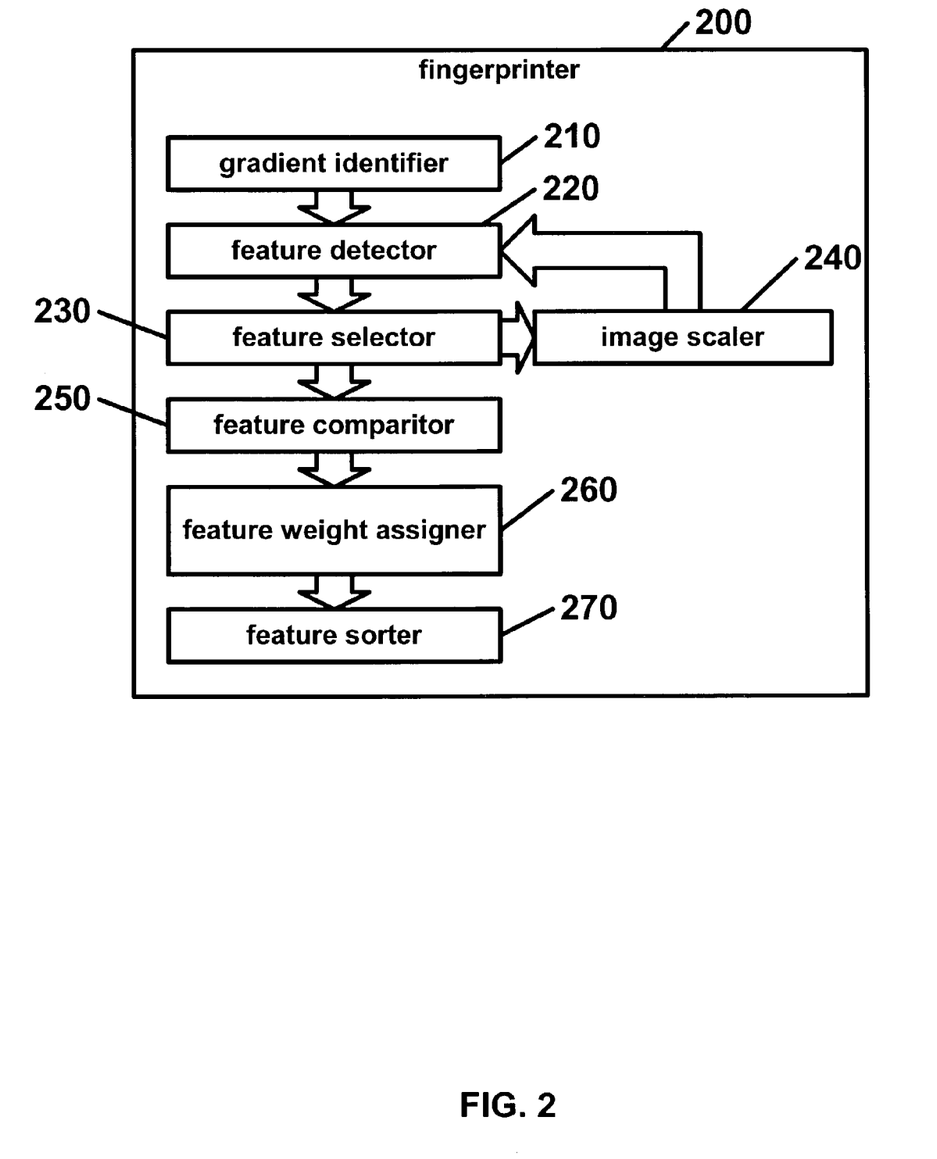
FIG. 2 is a block diagram of a fingerprinter as per an embodiment of the present invention.

FIG. 2 is a block diagram of a fingerprinter 200 as per an embodiment of the present invention. The fingerprinter 200 generates a series of selected features from an image which may later be used to uniquely identify that image. This first image fingerprint may also be compared with the fingerprints of other images to determine if the other images are derived from the first image.

Gradient identifier 210 may transform the image to bring forth gradients. For example, gradient identifier may be a gray converter where color images may be transformed into gray-level images. A feature detector 220 may then detect features such as corner features. Those skilled in the art will recognize that any type of feature may be detected, and that the feature detection may be adjusted depending upon the nature of the image. Examples of other types of features may include vertical lines, horizontal lines, circles, defined shapes such as boat shapes, etc. A feature selector 230 may then analyze the detected features and select from the detected features a set of the best or strongest features for further processing. Features may be compared to other features in their immediate neighborhood and the best ones, for example. local maximums of corner strengths, may be used. An image scaler 240 may then reduce the gradient image for further processing by the feature detector 220 and the feature selector 230. The goal is to create an image pyramid representing the image in various resolutions. Typically, in each step, the image scaler 240 may reduce the resolution of the image by a predefined amount (such as 25%) until a predefined size (such as thumbnail) is reached.

The order of image scaling, feature selection and feature detection may be rearranged. The goal is to collect a set of selected features for a series of reduced resolution images which make up an image pyramid.

Feature comparator 250 may compare the selected features chosen at each level of the pyramid to other features at the same level for matches using methods such as normalized cross-correlation. A feature weight assigner 260 may then assign weights to the features based on the number of other features they match. A feature sorter 270 may then sort the features into a list using the weights as a sort criterion, starting with the features having the fewest matches first. These sorted lists of features including the weights are our representation of the image at each level of the pyramid.

Figure 3:
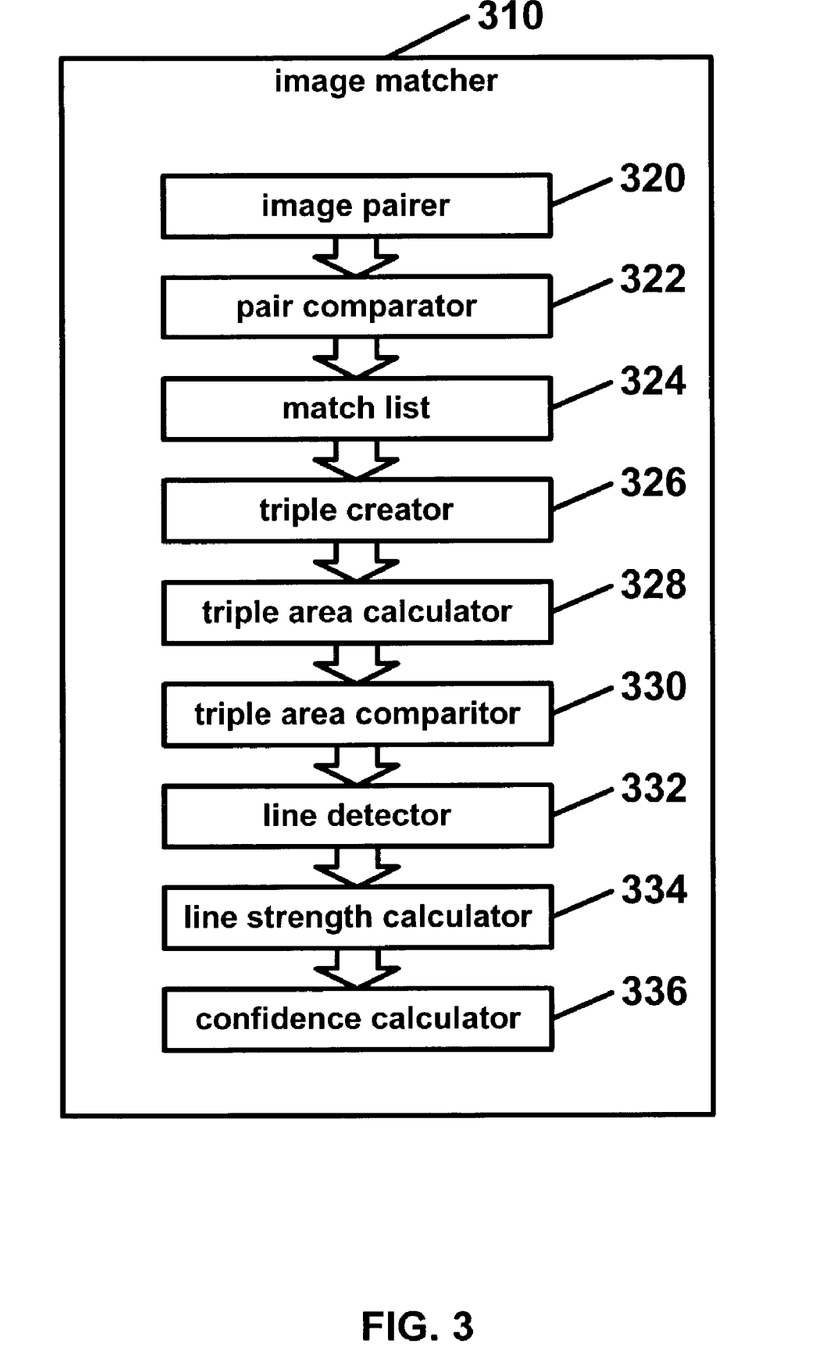
FIG. 3 is a block diagram of an image comparator as per an embodiment of the present invention.

FIG. 3 is a block diagram of an image matcher 310 as per an embodiment of the present invention. Image matcher 310 may compare images to determine if one of the images may be a copy of the other image. In some embodiments of the present invention incorporating this image matcher 310, an image may be compared to a collection of images.

An image pairer 320 inputs a first fingerprint from a first image, inputs a second fingerprint from a second image and then creates pairs of images from the image pyramids embedded in the fingerprints. Generally, the fingerprints are created using the same fingerprinting parameters. An exception may be when fingerprinting the second image. In this case it may be desireable to use a lower threshold for the feature detector 220, and to not pick local maximums of strength for the feature selector 230. To improve speed, this fingerprinting step may be postponed until feature points are needed for matching.

The pairs of images may be created from the two pyramids using their sizes as a criterion; assume that the second image could be a cropped version of the first (or model) image. Many possible image pairings may be made including creating all possible image pairings.

A pair comparator 322 preferably compares images starting with image pairs from the bottoms of the pyramids (lowest resolutions first). The comparison looks for images having matching feature points. The comparison may use techniques such as normalized cross-correlation. When matches are found they may be stored in a match list 324.

A triple creator 326 may then form triples from the match list 324. For each triple, a triple area calculator 328 may compute the area Am of the triangle formed by the location of the selected features (herein after referred to as points) in the first image, and the area An of the triangle formed by the points in the second image. A line detector 332 may then look for lines among the triples. The line may run from through (0,0) in the (Am,An) space. The points on this line may be formed by triples. Line strength may be calculated by a line strength calculator 334. A line strength calculation is typically based upon the number of points on a line. Each line may define a possible match between pairs of images and may also define the affine transform parameters between the image pair. All matching triples should belong to the same line in this space.

The confidence is assigned to each match based on the number of matching points. If the confidence is high enough, matching proceeds with a higher resolution image pair using the affine transform parameters obtained at a previous resolution as a guide for possible matches.

A confidence calculator 336 may calculate a confidence value which represents the likelihood that the second image is a copy of the first image. If the confidence of match is low, at any level, the process may stop and the last matched pair of images with high enough confidence may be output (if the image size is above a predefined threshold). Otherwise, a mismatch may be reported and a next image is taken from the collection of images.

Figure 4:
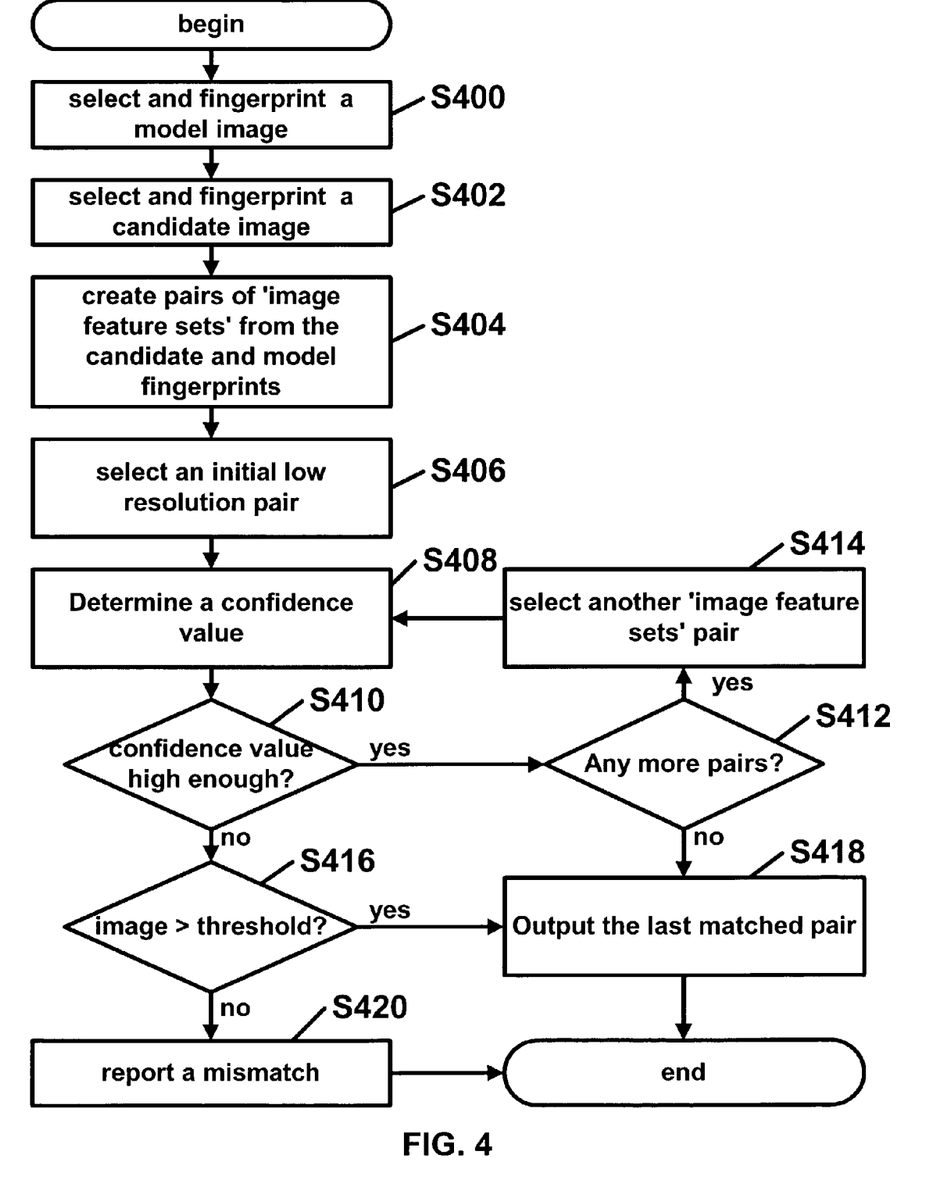
FIG. 4 is a flow diagram of a image matcher as per an embodiment of the present invention.

FIG. 4 is a flow diagram of an image matcher 310 as per an embodiment of the present invention. The image matcher 310 preferably determines if a candidate image is derived from a target image. A target image is an image may have been copied from a target image. It may be a first copy or a many generations old copy. Further the copy may be a one to one copy, an enlarged copy, or a reduced copy. The copy may have been subject to a transformation. Examples of transformations include cropping, rotation, and distortions. Further examples may be found by examining available effects in image processing software such as Adobe photoshop.

At step S400 a model image may be selected and then fingerprinted as disclosed herein. A candidate image may also be selected and fingerprinted at step S402. Next, pairs of 'image feature sets' may be created from the candidate and model fingerprints at step S404. An initial low resolution pair may then be selected for an initial comparison at step S408. At step S408 a confidence value may be determined by examining how many points match between current pair. A determination of whether the confidence value is high enough may be made at step S410. If the determination is positive, then a second determination may be made at step S412 to find out if there are any more image feature pair sets. If there are, then another "another 'image feature sets' pair may be selected at step S414 and flow returned to step S408 to determine a new confidence value. If there are no other pairs, then the last matched pair may be outputted at step S418.

If the confidence value was not high enough at step S410, then a determination may be made at step S416 to see if the images confidence value has exceeded a predetermined threshold. If it has, then the last matched pair may be outputted at step S418. If it has not, then a mismatch may be reported at S420.

Figure 5:
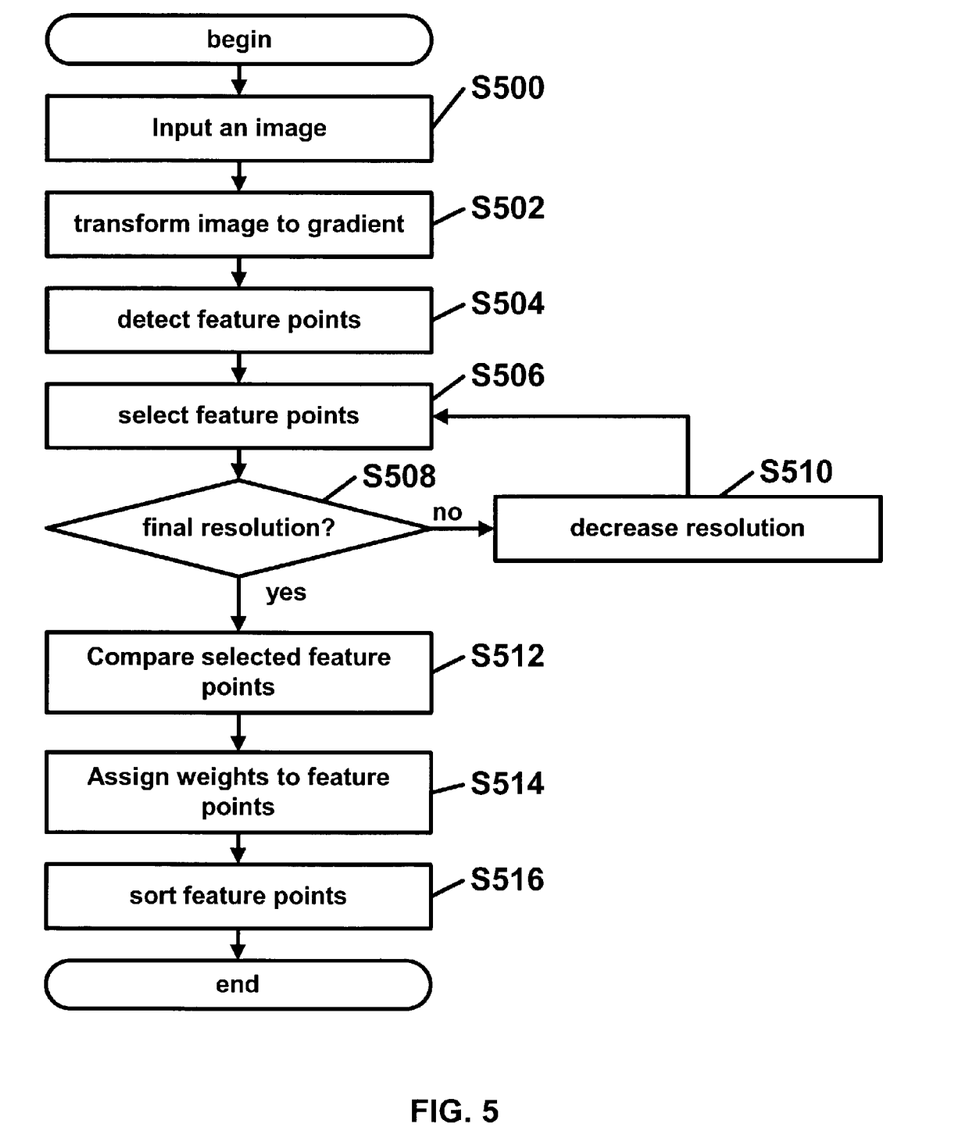
FIG. 5 is a flow diagram of a fingerprinting algorithm as per an embodiment of the present invention.

FIG. 5 is a flow diagram of a fingerprinting algorithm as per an embodiment of the present invention. An image may be inputted for fingerprinting at step S500. Then, at step S502, the image may be transformed into a gradient such as a gray-level image. Next, feature points are preferably detected at step S506. The feature points may be curves, lines intersections, shapes, etc. Feature points may then be selected at step S506. A determination of whether the image being analyzed is at a final resolution may be made at step S508. If the determination is negative, then the resolution may be decreased at step S510 and the process returned to step S506.

If at step S508, it was determined that the image being analyzed was at a final resolution, then selected feature points may be compared at step S512. Next, at step S514, weights may be assigned to the selected feature points. Finally, at step S516, the feature points may be sorted.

Figure 6:
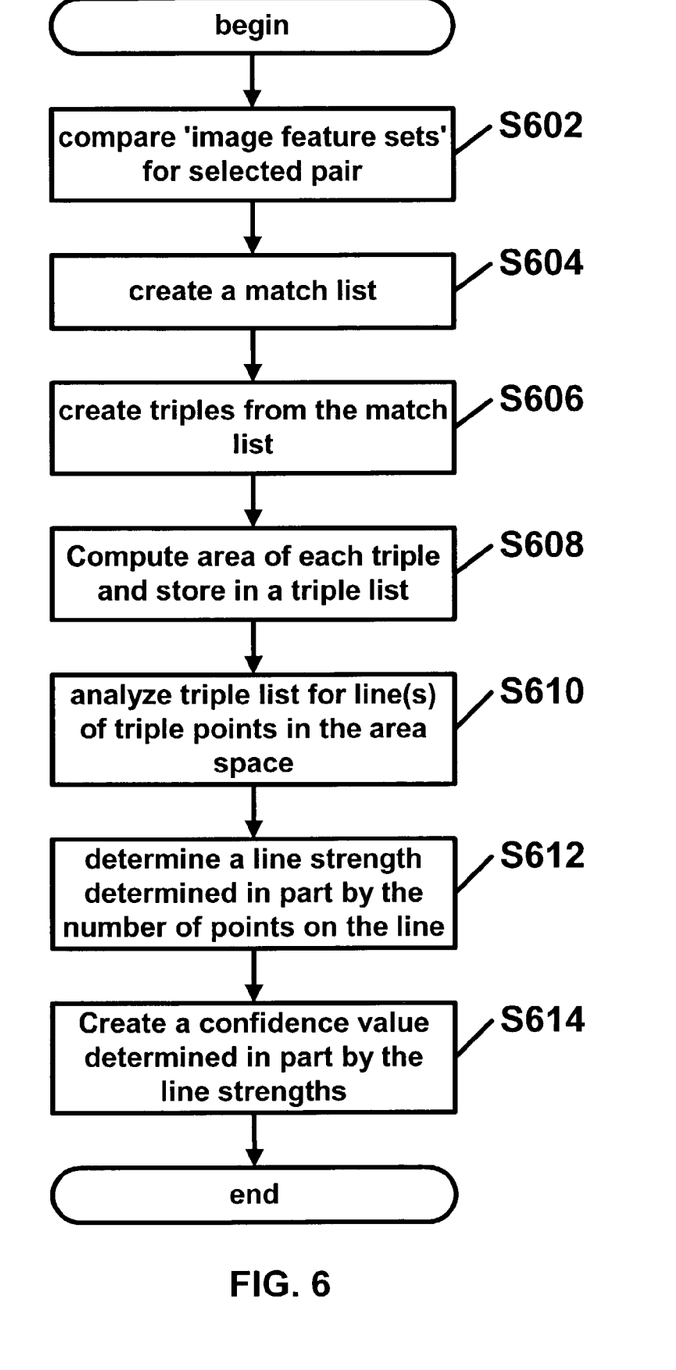
FIG. 6 is a flow diagram of a matching confidence algorithm as per an embodiment of the present invention.

FIG. 6 is a flow diagram of a matching confidence algorithm as per an aspect of an embodiment of the present invention. At step S602, 'image feature sets' for a selected pair may be compared. Next, a mach list is preferably created at step S604. Triples may then be created from the match list at step S606. The area of each triple may then be computed and then stored in a triple list at step S608.

The triple list may then be analyzed for line(s) of triple points in the area space at step S610. At step S612, a line strength may be determined in part by the number of points on the line. This line strength may then be used in part in creating a confidence value.

Disclosed is a method for fingerprinting an image comprising the steps of: transforming the image to a gradient image; while the resolution of the gradient image is greater than a predetermined final resolution, iteratively: detecting features in the gradient image; creating a set of selected features from the detected features using a predetermined selection algorithm; associating the set of selected features with the current resolution gradient image; saving the set of selected features and the associated current resolution as a resolution specific image feature set; and decreasing the resolution of the gradient image; comparing the sets of saved selected features in at least one of the resolution specific image feature sets; assigning weights to the selected features in the resolution specific image feature sets using a predetermined weight setting algorithm; and sorting the selected feature points in the resolution specific image feature sets; wherein the resolution specific image feature sets now comprise a fingerprint for the fingerprinted image.

The step of detecting feature points in the gradient image may further includes the step of analyzing the gradient image for corner features. Examples of gradient images include a gray-scale image, or a color separated image. The predetermined selection algorithm may include the steps of comparing the feature with other features in the immediate neighborhood using normalized cross-correlation. The predetermined weight setting algorithm may include the steps of determining the number of matches for at least one of the features; and assigning a weight to the feature determined by the number of matches. The step of sorting the feature points may include sorting the feature points by resolution size.

A method for determining if a second image is a derivative copy of a first image comprising the steps of: generating a first image fingerprint using a fingerprinting algorithm which generates at least one resolution specific image feature set, each of the resolution specific image feature sets corresponding to a specific resolution variant of the image being fingerprinted using the fingerprinting algorithm; generating a second image fingerprint using the fingerprinting algorithm; creating at least one image feature set pair from the first image fingerprint and the second image fingerprint, where each image feature set pair consists of at least one resolution specific image feature set from the first image fingerprint and at least one resolution specific feature set from the second image fingerprint; and starting with an initial low resolution image feature set pair, iteratively: determining a confidence value for the image feature set pair; outputting the last matched pair if the confidence value is greater than a predetermined confidence threshold and there are no more image feature set pairs to process; outputting the last matched pair if the confidence value is less than a predetermined confidence and the highest resolution of any image features are greater than a predetermined resolution threshold; and reporting a mismatch if the confidence value is less than a predetermined confidence and the highest resolution of any image feature is not greater than a predetermined resolution threshold. When fingerprinting an image, the resolution of all of the resolution specific image feature sets in the image feature set pair may or may not be the same.

The step of determining a confidence value for the image feature set pair may include the steps of: comparing the image feature sets in the image feature set pair for matching features; creating a match list from the matching features; creating triples from the match list; computing triple areas from each of the triples; creating a triple list from the triple areas; locating lines of triple points in the triple list; determining a line strength for each of the lines using the number of triple points in each of the lines; and creating the confidence value utilizing the line strengths.

The image fingerprinter may comprise: a gradient identifier for converting the image to a gradient image; an image scaler for resealing the gradient image into a pyramid of various resolution gradient images, the pyramid having a multitude of pyramid levels; a feature detector for detecting features in each the pyramid of various resolution gradient images; a feature selector for selecting at least one selected feature point from each of the gradient images; a feature comparator for comparing the selected features from the gradient images at the same pyramid level for matches; a feature weight assigner for assigning a weight to each of the features determined by the quantity of matches each of the selected features has; and a feature sorter for sorting the selected features by their assigned weights; wherein, the fingerprint includes the sorted features and the assigned weights. The gradient identifier may be a gray converter and the gradient image may be a gray-scale image. The features may be any features including corner features. The feature selector may compare the detected features in a local neighborhood with other detected features in the same local neighborhood, and only select the best detected features as the at least one selected feature point. The feature comparator may use cross-correlation to determine matches. Further, the feature detector may have an adjustable threshold.

Also disclosed is an image matching apparatus for determining whether a second image is a derivative copy of a first image may include: an image fingerprinter for generating a first fingerprint from the first image using a first threshold and a second fingerprint from the second image using a second threshold, the fingerprints may include sorted features with assigned weights, each of the assigned weights indicating the importance of each of the sorted features, each of the sorted features associated with a specific resolution version of the image fingerprinted; and a comparator for determining matches from the fingerprints further comprising: an image pairer for creating a multitude of sorted feature pairs, each pair containing at least one sorted feature from the first fingerprint and at least one sorted feature from the second fingerprint; a pair comparator for analyzing the features in the pairs for matches; match list for holding the matches; a triplet creator for creating triplets from the matches in the match list; a triple area calculator for calculating a first image area and a second image area for each the triplet; a triple list for storing the triplets, the first image areas, and the second image areas; a line detector for detecting lines in the space defined by the first image areas, and the second image areas; a line strength calculator which calculates a line strength for each of the detected lines determined by the number of points on each of the lines; and a confidence calculator for determining an overall match confidence determined by the line strengths; wherein the apparatus reports a match if the confidence value is greater than a confidence threshold. The apparatus may further include a database for storing the fingerprints. The second threshold may be less than the first threshold. Image size may be used as a criterion for creating the pairs. A multitude of image size combinations may be used in creating the pairs. The line strength calculator may calculate line strength determined by the number of points on the line.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A method for fingerprinting an image comprising the steps of:
   a. transforming said image to a gradient image;
   b. while the resolution of said gradient image is greater than a predetermined final resolution, iteratively:
      i. detecting features in said gradient image;
      ii. creating a set of selected features from said detected features using a predetermined selection algorithm;
      iii. associating said set of selected features with the current resolution gradient image;
      iv. saving said set of selected features and said associated current resolution as a resolution specific image feature set; and
      v. decreasing the resolution of said gradient image;
   c. comparing said sets of saved selected features in at least one of said resolution specific image feature sets;
   d. assigning weights to said selected features in said resolution specific image feature sets using a predetermined weight setting algorithm; and
   e. sorting said selected feature points in said resolution specific image feature sets;

wherein said resolution specific image feature sets now comprise a fingerprint for said fingerprinted image.

2. A method according to claim 1 wherein said step of detecting feature points in said gradient image further includes the step of analyzing said gradient image for corner features.

3. A method according to claim 1 wherein said gradient image is a gray-scale image.

4. A method according to claim 1 wherein said gradient image is a color separated.

5. A method according to claim 1 wherein said predetermined selection algorithm includes the steps of comparing said feature with other features in the immediate neighborhood using normalized cross-correlation.

6. A method according to claim 1 wherein said predetermined weight setting algorithm includes the steps of determining the number of matches for at least one of said features; and assigning a weight to said feature determined by said number of matches.

7. A method according to claim 1 wherein said step of sorting said feature points includes sorting said feature points by resolution size.

8. A method for determining if a second image is a derivative copy of a first image comprising the steps of:
   a. generating a first set of selected features for the first image using a fingerprinting algorithm which generates at least one resolution specific image feature set, each of said resolution specific image feature sets corresponding to a specific resolution variant of the image being fingerprinted using said fingerprinting algorithm;
   b. generating a second set of selected features for the second image using said fingerprinting algorithm;
   c. creating at least one image feature set pair from said first set of selected features and said second set of selected features, where each image feature set pair consists of at least one resolution specific image feature set from said first set of selected features and at least one resolution specific feature set from said second set of selected features; and
   d. starting with an initial low resolution image feature set pair, iteratively:
      i. determining a confidence value for said image feature set pair;
      ii. outputting the last matched pair if said confidence value is greater than a predetermined confidence threshold and there are no more image feature set pairs to process;
      iii. outputting the last matched pair if said confidence value is less than a predetermined confidence and the highest resolution of any image features are greater than a predetermined resolution threshold; and
      iv. reporting a mismatch if said confidence value is less than a predetermined confidence and the highest resolution of any image feature is not greater than a predetermined resolution threshold.

9. A method according to claim 8 wherein the resolution of all of the resolution specific image feature sets in said image feature set pair are not the same.

10. A method according to claim 8 wherein the resolution of at least two of the resolution specific image feature sets in said image feature set pair are the same.

11. A method according to claim 8 wherein the step of determining a confidence value for said image feature set pair includes the steps of:
   a. comparing the image feature sets in said image feature set pair for matching features;
   b. creating a match list from said matching features;
   c. creating triples from said match list;
   d. computing triple areas from each of said triples;
   e. creating a triple list from said triple areas;
   f. locating lines of triple points in said triple list;
   g. determining a line strength for each of said lines using the number of triple points in each of said lines; and
   h. creating said confidence value utilizing said line strengths.

12. An image fingerprinter for generating a fingerprint from an image comprising:
   a. a gradient identifier for converting said image to a gradient image;
   b. an image scaler for rescaling said gradient image into a pyramid of various resolution gradient images, said pyramid having a multitude of pyramid levels;
   c. a feature detector for detecting features in each said pyramid of various resolution gradient images;
   d. a feature selector for selecting at least one selected feature point from each of said gradient images;
   e. a feature comparator for comparing said selected features from said gradient images at the same pyramid level for matches;
   f. a feature weight assigner for assigning a weight to each of said features determined by the quantity of matches each of said selected features has; and
   g. a feature sorter for sorting said selected features by their assigned weights;
   wherein, said fingerprint includes said sorted features and said assigned weights.

13. An image fingerprinter according to claim 12, wherein said gradient identifier is a gray converter.

14. An image fingerprinter according to claim 12, wherein said gradient image is a gray-scale image.

15. An image fingerprinter according to claim 12, wherein said features are corner features.

16. An image fingerprinter according to claim 12, wherein said feature selector compares said detected features in a local neighborhood with other detected features in the same local neighborhood, and only selects the best detected features as said at least one selected feature point.

17. An image fingerprinter according to claim 12, wherein said feature comparator uses cross-correlation to determine matches.

18. An image fingerprinter according to claim 12, wherein said feature detector has an adjustable threshold.

19. An image matching apparatus for determining whether a second image is a derivative copy of a first image comprising:
   a. an image fingerprinter for generating a first fingerprint from said first image using a first threshold and a second fingerprint from said second image using a second threshold, said fingerprints including sorted features with assigned weights, each of said assigned weights indicating the importance of each of said sorted features, each of said sorted features associated with a specific resolution version of the image fingerprinted; and
   b. a comparator for determining matches from said fingerprints further comprising:
      i. an image pairer for creating a multitude of sorted feature pairs, each pair containing at least one sorted feature from said first fingerprint and at least one sorted feature from said second fingerprint;
      ii. a pair comparator for analyzing said features in said pairs for matches;
      iii. match list for holding said matches;

iv. a triplet creator for creating triplets from said matches in said match list;
v. a triple area calculator for calculating a first image area and a second image area for each said triplet;
vi. a triple list for storing said triplets, said first image areas, and said second image areas;
vii. a line detector for detecting lines in the space defined by said first image areas, and said second image areas;
viii. a line strength calculator which calculates a line strength for each of said detected lines determined by the number of points on each of said lines; and
ix. a confidence calculator for determining an overall match confidence determined by said line strengths;

wherein said apparatus reports a match if said confidence value is greater than a confidence threshold.

20. An image matching apparatus according to claim 19, further including a database for storing said fingerprints.

21. An image matching apparatus according to claim 19, wherein said second threshold is less than said first threshold.

22. An image matching apparatus according to claim 19, wherein image size is used as a criterion for creating said pairs.

23. An image matching apparatus according to claim 22, wherein a multitude of image size combinations are used in creating said pairs.

24. An image matching apparatus according to claim 22, wherein said line strength calculator calculates line strength determined by the number of points on said line.

* * * * *